United States Patent
Fujimoto et al.

(10) Patent No.: US 9,776,453 B2
(45) Date of Patent: Oct. 3, 2017

(54) TIGHTENING DEVICE AND TIGHTENING METHOD

(71) Applicants: TONE CO., LTD., Osaka (JP); Fuji Jukogyo Kabushiki Kaisha, Tokyo (JP)

(72) Inventors: Katsuhiro Fujimoto, Osaka (JP); Toshihiko Kushida, Osaka (JP); Tatsuo Hirai, Shiga (JP); Yukio Torigai, Osaka (JP); Tatsuo Nakahata, Tokyo (JP); Manabu Saito, Tokyo (JP); Masao Watanabe, Tokyo (JP)

(73) Assignees: FUJI JUKOGYO KABUSHIKI KAISHA, Tokyo (JP); TONE CO., LTD., Osaka (JP)

( * ) Notice: Subject to any disclaimer, the term of this patent is extended or adjusted under 35 U.S.C. 154(b) by 463 days.

(21) Appl. No.: 14/529,863

(22) Filed: Oct. 31, 2014

(65) Prior Publication Data
US 2015/0122522 A1    May 7, 2015

(30) Foreign Application Priority Data
Nov. 5, 2013 (JP) .................................. 2013-229147

(51) Int. Cl.
*B25B 23/14* (2006.01)
*B60B 29/00* (2006.01)
(Continued)

(52) U.S. Cl.
CPC ............ *B60B 29/006* (2013.01); *B25B 21/00* (2013.01); *B25B 23/14* (2013.01); *B25B 23/147* (2013.01); *B25F 5/001* (2013.01)

(58) Field of Classification Search
CPC ................ B25B 23/14; B25B 23/1405; B25B 23/1475; B25B 23/147; B25B 21/00; B25B 21/02; B23P 19/066; B25F 5/001
(Continued)

(56) References Cited

U.S. PATENT DOCUMENTS 4,316,512 A * 2/1982 Kibblewhite ...... G01D 5/24404
173/183
5,366,026 A * 11/1994 Maruyama ............ B23P 19/066
173/180
(Continued)

FOREIGN PATENT DOCUMENTS

DE     32 30 642 A1    2/1984
JP     07-246530 A     9/1995
(Continued)

OTHER PUBLICATIONS

European Patent Office, "extended European search report for EP 14 19 0734", Apr. 16, 2015, 7 pp.
(Continued)

*Primary Examiner* — Scott A. Smith
(74) *Attorney, Agent, or Firm* — Eckert Seamans; Stephen Bucchianeri; Grant Coffield (57) ABSTRACT

A tightening device and a tightening method are able to check that a fastening member has been fastened to a desired set torque or greater after being tightened, without loosening the fastening member. The tightening device executes a first tightening process of adjusting the output of a motor after measured torque that is measured by a torque detector has reached a preset first control start torque, such that the measured torque reaches a preset first set torque in a phased manner through repeated increases and decreases in torque, and blocking power supply to the motor when the measured torque reaches the first set torque, and then executes a second tightening process of driving the motor at an initial
(Continued)

output that is less than in the first tightening process, adjusting the output of the motor after the measured torque that is measured by the torque detector has reached a preset second control start torque, such that the measured torque reaches a preset second set torque in a phased manner through repeated increases and decreases in torque, and blocking power supply to the motor when the measured torque reaches the second set torque.

8 Claims, 5 Drawing Sheets

(51) Int. Cl.
*B25B 21/00* (2006.01)
*B25B 23/147* (2006.01)
*B25F 5/00* (2006.01)

(58) Field of Classification Search
USPC ..... 173/2, 176, 178, 179, 180, 181, 183, 93, 173/93.5, 217; 73/862.21, 862.23
See application file for complete search history.

(56) References Cited

U.S. PATENT DOCUMENTS

| | | | | |
|---|---|---|---|---|
| 6,167,606 B1* | 1/2001 | Mueller | ................ | B23P 19/066 173/181 |
| 6,668,212 B2* | 12/2003 | Colangelo, III | ...... | B25B 23/145 173/5 |
| 6,680,595 B2* | 1/2004 | Ito | ...................... | B25B 23/1405 173/11 |
| 6,836,614 B2* | 12/2004 | Gilmore | ................ | B23P 19/066 173/176 |
| 6,968,908 B2* | 11/2005 | Tokunaga | ................ | B25B 21/02 173/181 |
| 7,275,450 B2* | 10/2007 | Hirai | ...................... | B25B 21/00 73/862.21 |
| 7,334,648 B2* | 2/2008 | Arimura | ................ | B25B 21/02 173/176 |
| 7,757,587 B2* | 7/2010 | Kaneyama | ............ | B23P 19/066 81/467 |
| 7,992,455 B2* | 8/2011 | Kushida | ................ | B23P 19/066 73/862.23 |
| 8,264,374 B2* | 9/2012 | Obatake | .................. | B25B 21/00 340/870.4 |
| 8,406,697 B2* | 3/2013 | Arimura | ................ | G08C 17/02 173/180 |
| 8,616,299 B2* | 12/2013 | Ichikawa | .................. | H02P 6/06 173/176 |
| 8,689,900 B2* | 4/2014 | Miwa | ...................... | B23B 45/02 173/176 |
| 8,985,237 B2* | 3/2015 | Kaufmann | ............... | B25B 23/14 173/179 |
| 2007/0247097 A1 | 10/2007 | Seiler et al. | | |
| 2013/0008679 A1* | 1/2013 | Nishikawa | .......... | B25B 23/1475 173/93 |

FOREIGN PATENT DOCUMENTS

| | | |
|---|---|---|
| JP | 2013-166211 A | 8/2013 |
| JP | 2013-202705 A | 10/2013 |
| WO | 2011/122361 A1 | 10/2011 |

OTHER PUBLICATIONS

Japanese Patent Office, "Office Action" from counterpart JP Application No. 2013-229147 (no English language translation available), 5 pp., Apr. 25, 2017.

* cited by examiner

| Set torque T (N·m) | Tightening Process | Tightening Mode | Tightening Torque (N·m) | Error (%) |
|---|---|---|---|---|
| 600 | 1st Tightening | Normal | 912 | 52.0% |
| | 1st Tightening | Hard | 603 | 0.6% |
| | 2nd Tightening | Hard | 629 | 4.9% |
| | 2nd Tightening | Checking | 611 | 1.9% |

FIG. 11

| Set torque T (N·m) | Tightening Process | Tightening Mode | Tightening Torque (N·m) | Error (%) |
|---|---|---|---|---|
| 600 | 1st Tightening | Normal | 608 | 1.3% |
| | 1st Tightening | Hard | 601 | 0.2% |
| | 2nd Tightening | Hard | 637 | 6.2% |
| | 2nd Tightening | Checking | 602 | 0.4% |

# TIGHTENING DEVICE AND TIGHTENING METHOD

BACKGROUND OF THE INVENTION

1. Field of the Invention

The present invention relates to a tightening device and a tightening method that are able to confirm that a fastening member such as a bolt or a nut is tightened to a set torque or greater.

2. Description of the Related Art

In order to increase the accuracy with which fastening members such as bolts or nuts are tightened, a known tightener measures the tightening torque that acts on the fastening member, and is numerically controlled to end the tightening when the measured torque reaches a set torque (e.g., see JP 2013-166211A).

Also, additional tightening that involves torque being further applied to tighten a fastening member that has already been tightened is performed in some cases (see JP 2013-166211A).

There is a need for a way of checking whether tightening has actually been performed to a desired set torque or greater, after a fastening member has been tightened or after additional tightening has been performed.

In tightening the wheel nuts of a vehicle, the wheel nuts are firstly tightened and run in, and then loosened and tightened again in order to check whether tightening has been performed to a prescribed set torque. Further running in thus needs to be performed when wheel nuts that have already been tightened once are loosened and retightened, making it difficult to determine whether the tightening torque has really reached the set torque.

An object of the present invention is to provide a tightening device and a tightening method that are able to check that a fastening member has been fastened to a desired set torque or greater after being tightened, without loosening the fastening member.

SUMMARY OF THE INVENTION

In order to solve the above problems, a tightening device of the present invention is a tightening device including a motor, a motor drive circuit that drives the motor, a drive shaft that is rotated by the motor, has a socket mounted on a tip thereof, and is configured to tighten a fastening member, a torque detector that detects a tightening torque that acts on the socket, and a control unit that controls the motor drive circuit based on a set torque set in advance and a measured torque measured by the torque detector. The control unit executes a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque, and then executes a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque, and blocking power supply to the motor when the measured torque reaches the second set torque.

Also, a method of controlling a tightening device according to the present invention is a method of controlling a tightening device that includes a motor, a motor drive circuit that drives the motor, a drive shaft that is rotated by the motor, has a socket mounted on a tip thereof, and is configured to tighten a fastening member, and a torque detector that detects a tightening torque that acts on the socket. The method includes a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque, and a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque, and blocking power supply to the motor when the measured torque reaches the second set torque.

Effects of the Invention

According to the tightening device and the tightening method of the present invention, a fastening member is tightened with a first set torque as a target value in a first tightening process, and then, in a second tightening process, a motor is driven at an initial output that is less than the initial output in the first tightening process, and tightening is implemented with a second set torque as the target value. By performing this second tightening process, it can be confirmed that the fastening member is tightened to at least the second set torque.

The second tightening process is able to prevent overtightening, or so-called overshooting, with respect to the second set torque, since the initial output of the motor is less than in the first tightening process, and tightening is performed by increasing the torque in a phased manner through repeated increases and decreases in torque.

DESCRIPTION OF THE PREFERRED EMBODIMENTS

Figure 1:
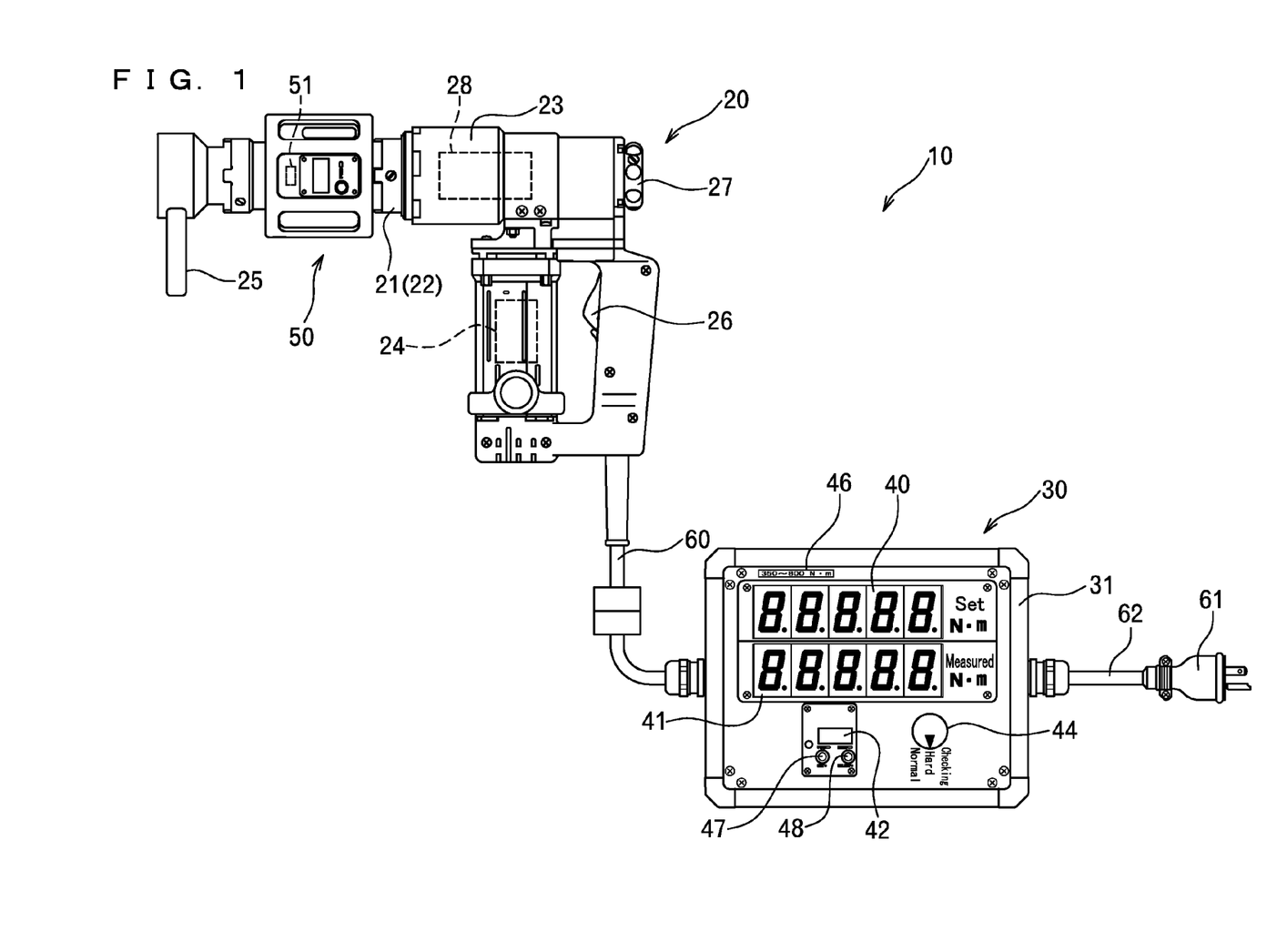
FIG. 1 is a schematic diagram illustrating a tightening device according to one embodiment of the present invention.
Figure 2:
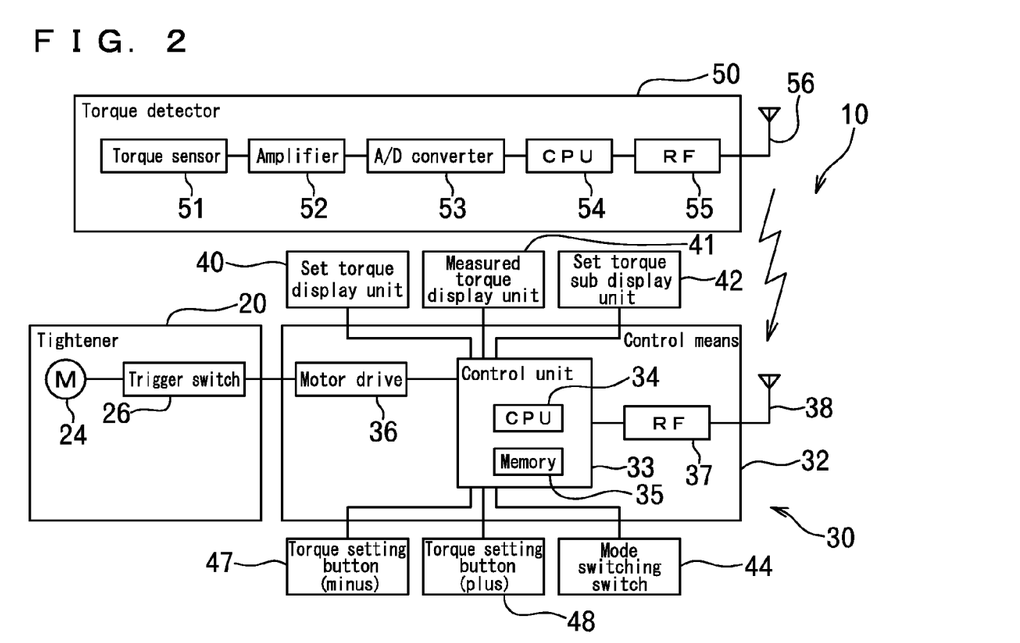
FIG. 2 is a block diagram of a tightening device according to one embodiment of the present invention.

Hereinafter, an embodiment in which a tightening device 10 of the present invention is applied to a numerically controlled tightening device constituted by a tightener 20 serving as a main body that performs the tightening, a control device 30 that controls the tightener 20, and a torque detector 50 that measures torque, as shown in FIGS. 1 and 2, will be described. Note that a configuration can also be adopted in which some or all of the functions of the control device 30 are incorporated in the tightener 20, or some of the functions of the control device 30 may be executed by an external PC or the like.

Figure 3:
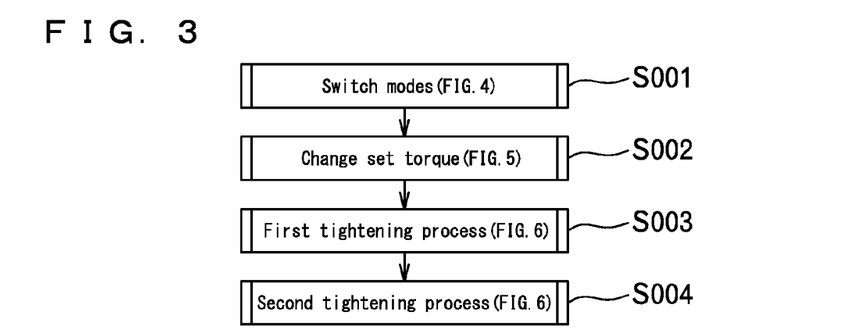
FIG. 3 is a flowchart showing the overall flow of a tightening method according to one embodiment of the present invention.

Also, in the following embodiment, the tightening process consists of a first tightening process and a second tightening process as shown in FIG. 3, with the first tightening process including a normal tightening mode and a hard tightening mode that depend on the member being fastened, and the second tightening process serving as a checking tightening mode that can check whether the tightening torque is a set torque or greater.

FIG. 1 is a diagram illustrating an outline of the tightening device 10 of the present invention, and FIG. 2 is a schematic block diagram of the tightening device 10. As shown in the diagrams, the tightening device 10 is constituted by the tightener 20 and the control device 30, and the tightener 20 is provided with the torque detector 50 which detects torque acting on a socket.

Tightener 20

In the embodiment shown in FIG. 1, a double-shaft power wrench in which a drive shaft 21 consists of an inner shaft and an outer shaft 22 is exemplified as the tightener 20. However, the power wrench is not limited to a double-shaft power wrench and may be a single-shaft power wrench, and the tightener 20 may be an impact wrench, an impact driver, an impact/hammer drill, or the like.

With the double-shaft tightener 20, the inner shaft and the outer shaft 22 forming the drive shaft 21 can be rotated in opposite directions to each other by a motor 24 built into a housing 23. The inner shaft and the outer shaft 22 can be connected to the motor 24 by a deceleration mechanism 28 such as a planetary gear mechanism.

The tightener 20 is provided, at a tip of the inner shaft, with a socket that is capable of mounting a fastening member such as a bolt or a nut. Also, a reaction receiver 25 that is equipped with an arm whose tip projects in a substantially perpendicular direction relative to the axial center of the drive shaft 21 is attached to a tip of the outer shaft 22.

The tightener 20, on receiving an instruction from a control device 30 shown in FIG. 2 as a result of a trigger switch 26 shown in FIG. 1 being operated, drives the motor 24 and rotates the drive shaft 21. Also, as shown in FIG. 1, the tightener 20 is equipped with a switch 27 for forward-reverse switching, and the rotation of the motor 24 can be reversed by operating the switch 27 for forward-reverse switching to enable tightening and loosening of a fastening member. The switch 27 for forward-reverse switching can be given as a switch that switches the rotation of the drive shaft 21 between forward and reverse mechanistically, through a gear change, clutch operation or the like of the deceleration mechanism 28. Also, the switch 27 for forward-reverse switching may be a switch that reverses the voltage that is supplied to the motor 24.

Torque Detector 50

The tightener 20 is equipped with the torque detector 50 for detecting the torque acting on the socket. The torque detector 50 transmits a signal relating to torque to the control device 30. As shown in FIG. 1, a torque detector in which a torque sensor 51 that detects tightening torque is directly mounted between the drive shaft 21 and the socket can be employed as the torque detector 50. The torque acting on the socket may be torque detected from a change in the electrical system of the tightener 20, such as the change in motor current, for example. Also, the torque acting on the socket may also be obtained through conversion from the rotation angle of the drive shaft 21, the motor 24, the deceleration mechanism 28 or the like.

Because the torque detector 50 rotates in tandem with the drive shaft 21 when mounted in the drive shaft 21 as shown in FIG. 1, cable connection with the control device 30 is not possible. Accordingly, it is desirable that the signal relating to tightening torque measured by the torque sensor 51 is amplified by an amplifier circuit 52, input to the CPU 54 after undergoing A/D conversion in an A/D converter circuit 53, and wirelessly transmitted via a RF (Radio Frequency) circuit 55 and an antenna 56, as shown in FIG. 2. Power supply to the torque detector 50 can be performed by installing a small battery in the torque detector 50.

As a specific embodiment, a distortion gauge adhered to the outer shaft 22 can be exemplified as the torque sensor 51. The tightening torque acting on the outer shaft 22 is output as a voltage change caused by the resistance change of the distortion gauge.

Control Device 30

The control device 30 is, as shown in FIG. 1, electrically connected to the tightener 20 by a connection cable 60, and is capable of communicating with the tightener 20 and supplying power to the tightener 20. Also, the control device 30 can be connected to a commercial power source by a power cable 62 that has a plug 61 connected to a tip thereof. Note that a configuration can also be adopted in which the control device 30 and/or the tightener 20 are battery operated, the cable 60 for connecting the control device 30 and the tightener 20 is omitted, and the control device 30 and the tightener 20 perform wireless communication.

As a specific embodiment, the control device 30 incorporates a control means 32 shown in FIG. 2 in a box-type casing 31, as shown in FIG. 1. The control means 32 is provided with a control unit 33 that is mainly constituted by electronic components including a CPU 34, a memory 35 such as RAM or ROM, and a D/A converter, and can be realized by various programs or the like stored in the memory 35. In FIG. 2, a functional block relating to typical functions that are realized by these connections is depicted. It should naturally be understood that these functional blocks can be realized using only hardware, only software, or a combination of hardware and software.

A set torque display unit 40 that displays a set torque that is desired by a user, and a measured torque display unit 41 that displays the tightening torque measured by the torque detector 50 are provided on one surface of the casing 31, as shown in FIG. 1. Also, torque setting buttons 47 and 48 for the user to increase or decrease the set torque, and a mode switching switch 44 for switching between a normal tightening mode and a hard tightening mode that serve as a first tightening process and a checking tightening mode that serves as a second tightening process are provided. Furthermore, a torque setting range display unit 46 that indicates the range over which the set torque of the tightening device 10 can be set is provided on the casing 31.

A digital display employing LEDs, for example, can be used for the set torque display unit 40 and the measured torque display unit 41. One or both of these display units can, in the case where an anomaly of some kind occurs in the tightening device 10, be used as an error display unit for displaying the anomaly. Note that, in FIG. 1, reference numeral 42 denotes a set torque sub display unit that displays the set torque when the torque setting buttons 47 and 48 are operated, and is smaller than the set torque display unit 40.

The torque setting buttons 47 and 48 are a minus button 47 for reducing the set torque and a plus button 48 for increasing the set torque. These torque setting buttons 47 and 48 can also be used as error cancellation buttons by operating one of the buttons when an anomaly of some kind occurs in the tightening device 10.

The mode switching switch 44 is a switch for switching the tightening mode between the first tightening process and the second tightening process, and a dial switch, for example, can be employed therefor. The text "Normal", "Hard" and "Checking" are marked on the casing 31 at corresponding positions, so as to enable the user to see what tightening mode the mode switching switch 44 is set to. The mode switching switch 44 may obviously be a button switch or a slide switch.

The torque setting range display unit 46 indicates the minimum and maximum set torque of the tightening device 10, as shown in FIG. 1. The setting range stamped into a plate as shown in FIG. 1 or printed on a sticker and attached to the casing 31 can be exemplified as the torque setting range display unit 46. A digital display can also be used therefor similarly to the above set torque display unit 40 and the like.

The control unit 33 constituting the control means 32 has, as shown in FIG. 2, the abovementioned display units 40, 41 and 42, buttons 47 and 78, and mode switching switch 44 connected thereto, together with a motor drive circuit 36 for driving the motor 24 of the tightener 20 via the trigger switch 26, and an RF circuit 37 and an antenna 38 for performing wireless communication with the torque detector 50. For example, output adjustment of the motor 24 by the motor drive circuit 36 can be performed by phase control or PWM control.

All programs for controlling the tightener 20 are stored in the memory 35. For example, stored in the memory 35 are set torques set by the user in correspondence with the respective tightening modes of the first tightening process and the second tightening process, tightening programs and various parameters corresponding to the respective tightening modes, the residing tightening mode, the control amount of the motor drive circuit 36 for adjusting the output of the motor 24 based on the measured torque that is received and the set torque, and the like.

Control of the tightening device 10 configured such as described above can be broadly divided, as shown in FIG. 3, into a mode switching flow (FIG. 4, step S001), a set torque changing flow (FIG. 5, step S002), and a tightening flow (FIG. 6) including the first tightening process (step S003) and the second tightening process (step S004).

Mode Switching Flow

The mode switching flow is a flow for switching between the first tightening process and the second tightening process, which in the present embodiment involves switching between the normal tightening mode and the hard tightening mode of the first tightening process and the checking tightening mode of the second tightening process.

Figure 4:
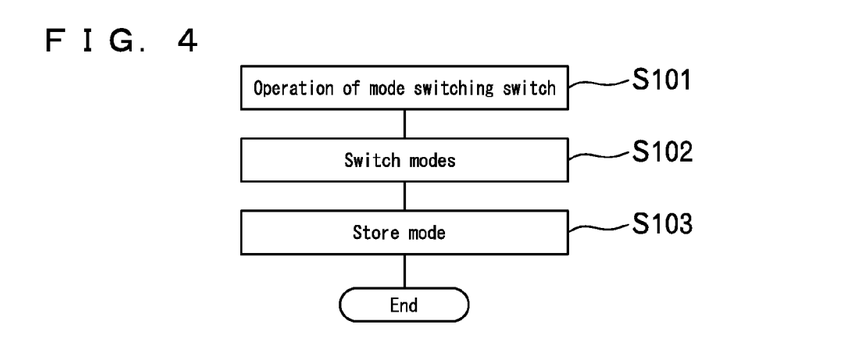
FIG. 4 is a flowchart showing a mode switching flow of a tightening device according to one embodiment of the present invention.

More specifically, as shown in FIG. 4, this involves processing for switching, when the mode switching switch 44 is operated (step S101), the residing tightening mode between the normal tightening mode and the hard tightening mode of the first tightening process and the checking tightening mode of the second tightening process (step S102), and storing the residing tightening mode in the memory 35 of the control unit 33 (step S103). Note that, in order to prevent erroneous operation, it is desirable to deactivate operation of the mode switching switch 44 during the set torque changing flow, the first tightening process, and the second tightening process which will be discussed later.

Set Torque Changing Flow

Figure 5:
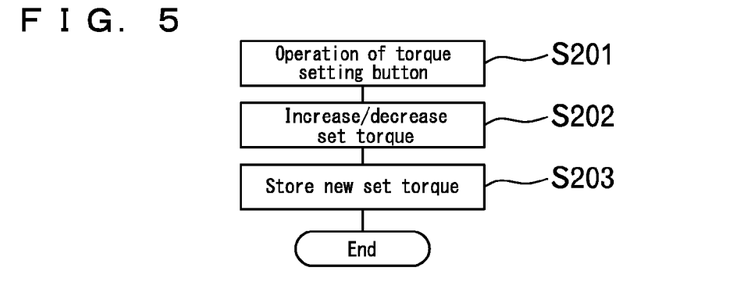
FIG. 5 is a flowchart showing a set torque changing flow of a tightening device according to one embodiment of the present invention.

The set torque changing flow (step S002) shown in FIG. 5 is performed after the mode switching flow (step S001) as shown in FIG. 3. This set torque changing flow is executed following the mode switching flow at the time of the initial setting of the tightening device 10 or in the case of changing the set torque of the respective tightening modes. In the present embodiment, the set torque (first set torque) of the normal tightening mode, the set torque (first set torque) of the hard tightening mode, and the set torque (second set torque) of the checking tightening mode are set. In the case of using the tightening device 10 in a state where the set torque has already been set or changed, execution of the set torque changing flow can be skipped.

The set torque changing flow is for setting and storing the set torque for the residing tightening mode, when the torque setting buttons 47 and 78 are operated.

As a specific embodiment, when the torque setting button 47 or 48 is operated (step S201), the control unit 33 increments or decrements the set torque that is stored in the memory 35 by the designated value, according to the operation of the torque setting button 47 or 48 (step S202), as shown in FIG. 5. Processing for storing the new set torque in the memory 35 as the set torque is then performed (step S203).

Note that it is desirable to deactivate operation of the torque setting buttons 47 and 48 during the mode switching flow, the first tightening process and the second tightening process in order to prevent erroneous operation, and a configuration may also be adopted in which the processing moves to step S203 after waiting for the torque setting button 47 or 48 to subsequently be operated within a predetermined time period after the torque setting button 47 or 48 has been operated.

Tightening Process

Figure 6:
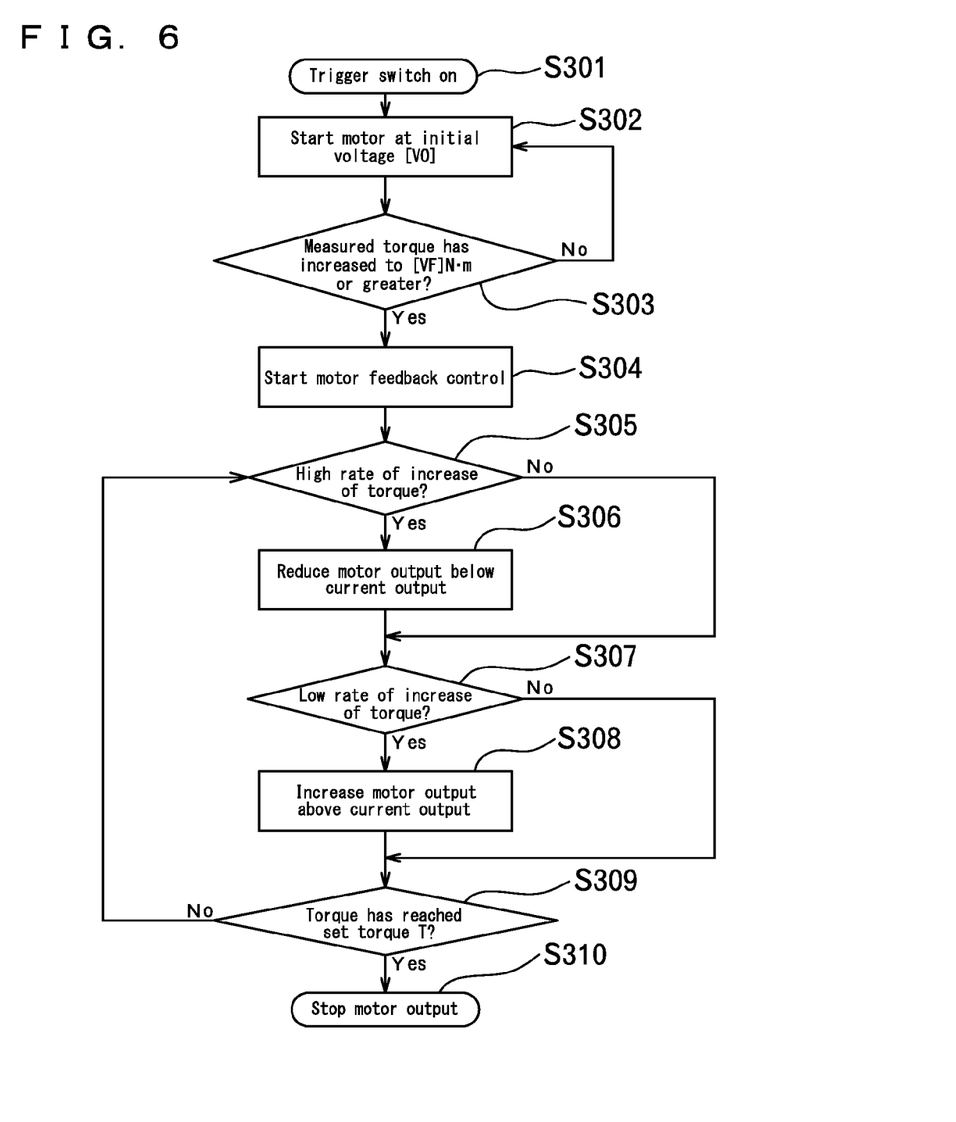
FIG. 6 is a flowchart showing a tightening flow of a tightening device according to one embodiment of the present invention.

After the set torque of each tightening mode has been set using the set torque changing flow (step S002), actual tightening process that depends on the selected tightening mode (step S003, step S004) follows, as shown in FIGS. 3 and 6.

Description of Tightening Modes

Here, an outline of each of the tightening modes consisting of the normal tightening mode and the hard tightening mode of the first tightening process, and the checking tightening mode of the second tightening process according to one embodiment of the present invention will be described.

Figure 7:
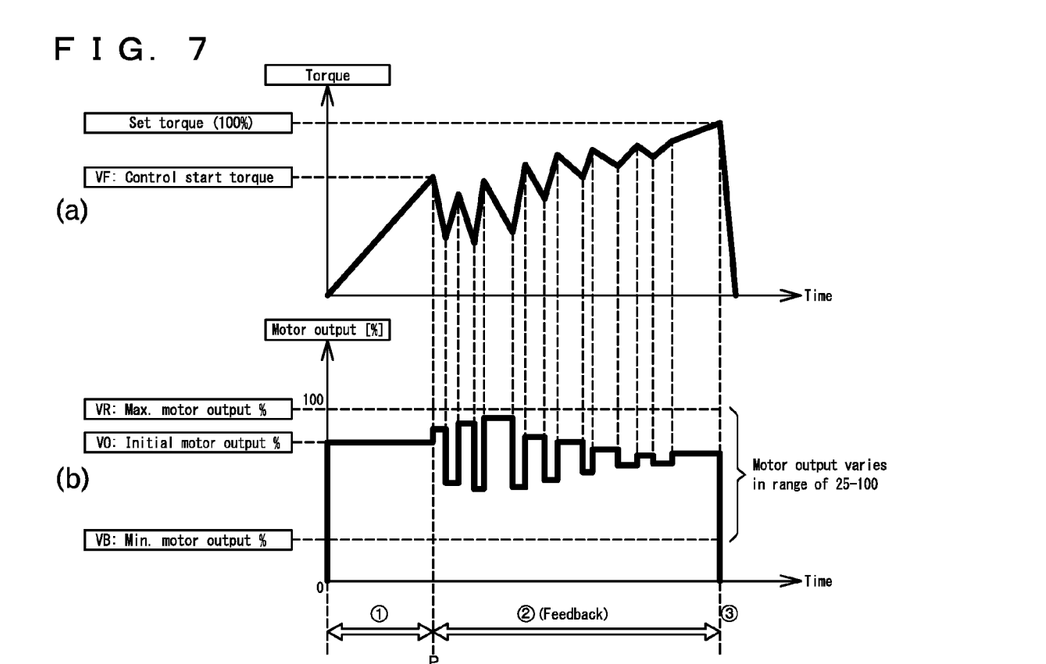
FIG. 7 is a graph showing the change in tightening torque in a normal tightening mode of a first tightening process, and a graph showing the change in motor output.
Figure 8:
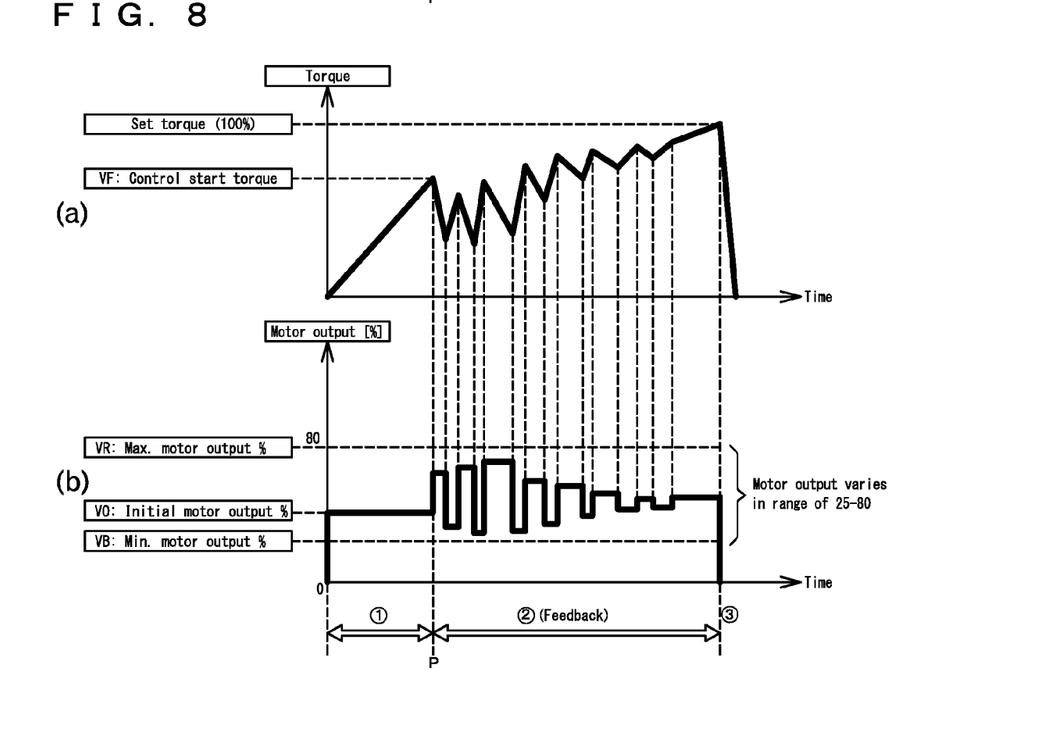
FIG. 8 is a graph showing the change in tightening torque in a hard tightening mode of a first tightening process, and a graph showing the change in motor output.
Figure 9:
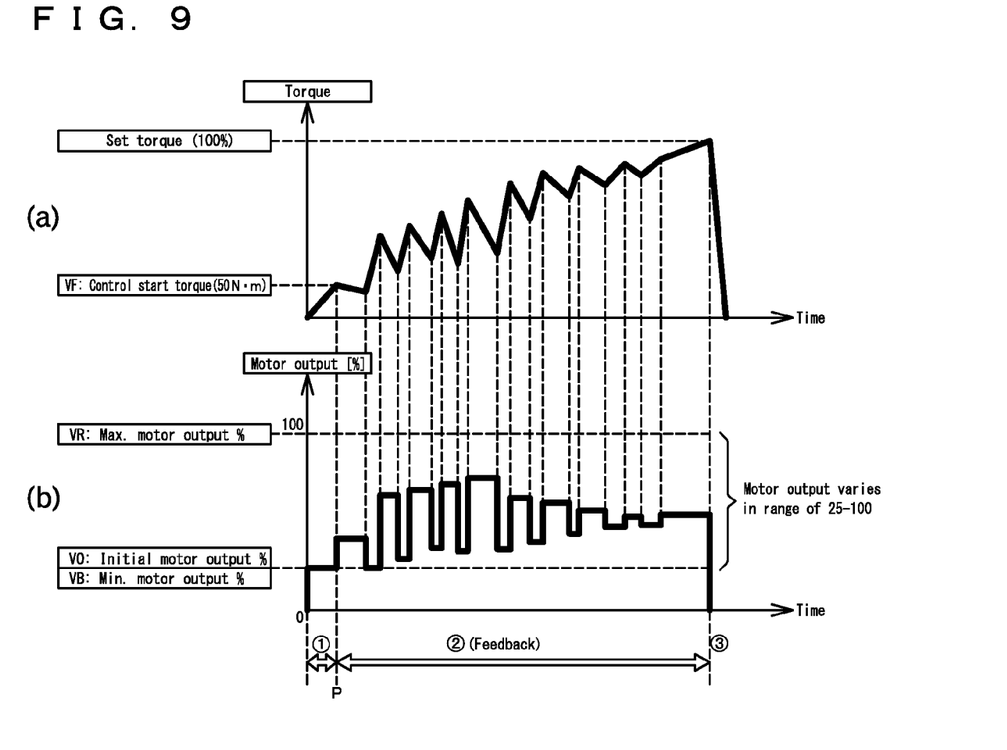
FIG. 9 is a graph showing the change in tightening torque in a checking tightening mode of a second tightening process, and a graph showing the change in motor output.

Although the values differ, in each tightening mode, as shown in FIGS. 7 to 9, the motor 24 is started at a predetermined initial output (V0) and maintains the initial output (V0). After the measured torque that is detected by the torque detector 50 has reached a predetermined control start torque (VF) (the first control start torque in the first tightening process, and the second control start torque in the second tightening process), the output of the motor 24 is feedback controlled based on the measured torque. In feedback control, the motor 24 is driven while adjusting the output within a predetermined range defined by a maximum output (VR) and a minimum output (VB) of the motor 24. The measured torque thereby increases in a phased manner through repeated increases and decreases in torque.

Power supply to the motor is then blocked when the measured torque reaches the set torque set in advance.

Normal Tightening Mode (First Tightening Process)

The normal tightening mode is a tightening mode in which the motor 24 has a large initial output, and is a tightening mode suitable for tightening a fastening target with respect to which the torque increment from 10% to 100% of the target torque is equivalent to an angular displacement of over 27 degrees (ISO 5393).

In the normal tightening mode, the initial output (V0) of the motor 24, as shown in FIG. 7, is the largest of the three tightening modes (see FIGS. 7 to 9). Accordingly, there is a risk of the tightening torque overshooting if this normal tightening mode is used to tighten a fastening target with respect to which the torque increment from 10% to 100% of the target torque is equivalent to an angular displacement of 27 degrees or less. On the other hand, because the motor 24 has a large initial output, there is an advantage in that tightening can be performed in a short time.

Hard Tightening Mode (First Tightening Process)

The hard tightening mode is a tightening mode suitable for tightening a fastening target with respect to which the torque increment from 10% to 100% of the target torque is equivalent to an angular displacement of 27 degrees or less (ISO 5393).

The hard tightening mode is a tightening mode in which the initial output (V0) of the motor 24, as shown in FIG. 8, is less than or equal to the normal tightening mode, and greater than the checking tightening mode discussed below. Thus, although overshooting of the tightening torque can be prevented, tightening will take longer than the normal tightening mode.

Checking Tightening Mode (Second Tightening Process)

The checking tightening mode is a tightening mode for checking, after the normal tightening mode or the hard tightening mode of the first tightening process, whether a fastening member tightened in either of these tightening modes is tightened to a predetermined torque or greater.

The checking tightening mode is a tightening mode in which the initial output (V0) of the motor 24, as shown in FIG. 9, is less than in the normal tightening mode and the hard tightening mode.

Thus, although the checking tightening mode takes longer to reach the predetermined set torque due to the low initial output (V0) of the motor 24 that is set, there is an advantage in that over-tightening (overshooting) can be prevented.

A more detailed control flow in the tightening modes is shown in FIG. 6. Note that although the first tightening process and the second tightening process are described together, when tightening a fastening member, first, the first tightening process of step S003 (normal tightening mode or hard tightening mode) is executed, and then the second tightening process of step S004 (checking tightening mode) is executed after tightening the fastening member to a predetermined set torque.

Selection of the normal tightening mode and the hard tightening mode in the first tightening process can be performed such that the normal tightening mode is selected in the case of a fastening target with respect to which the torque increment from 10% to 100% of the target torque is equivalent to an angular displacement of over 27 degrees, and the hard tightening mode is selected in the case of a fastening target with respect to which the torque increment from 10% to 100% of the target torque is equivalent to an angular displacement of 27 degrees or less.

The tightening flow is started by turning on the trigger switch 26 in a state where the socket of the tightener 20 is fitted to the fastening member (step S301). With the tightener 20 shown in FIG. 1, the trigger switch 26 is turned on by the user pulling the trigger switch 26 with a finger.

When the trigger switch 26 is turned on (step S301), the control unit 33 controls power supply from the motor drive circuit 36 to the motor 24 according to the residing tightening mode and the set torque thereof with reference to the memory 35, and drives the motor 24 at the initial output (V0) (step S302). The reaction receiver 25 thereby rotates in the reverse direction to the tightening direction of the socket and contacts another fastening member or the like, and the fastening member starts being tightened by the socket.

The initial output (V0) is set to satisfy the following relationship, where VB is the minimum starting output of the motor 24: initial output of normal tightening mode≥initial output of hard tightening mode≥initial output of checking tightening mode≥VB. More favorable checking tightening can be performed when the initial output of the checking tightening mode coincides with or most nearly approximates the minimum starting output (VB).

When the motor 24 starts driving, the torque detector 50 detects the torque acting on the socket, and transmits the detected torque to the control means 32 as the measured torque. The motor is driven at the initial output (V0) until the measured torque reaches the prescribed control start torque (VF) corresponding to each tightening mode (No at step S303; range indicated by circled number 1 in FIGS. 7 to 9). When the measured torque reaches the prescribed control start torque (VF) (YES at step S303; P in FIGS. 7 to 9), motor feedback control is started (step S304; range indicated by circled number 2 in FIGS. 7 to 9). Note that prescribed torque (VF) can be set in correspondence with the tightening mode. The control start torque (VF) can be set respectively in the first tightening process (first control start torque) and the second tightening process (second control start torque), in which case: first control start torque (VF)≥second control start torque (VF). Desirably, the following relationship is satisfied: control start torque (VF) of normal tightening mode≥control start torque (VF) of hard tightening mode>control start torque (VF) of checking tightening mode. For example, in FIGS. 7 to 9, the control start torque of the normal tightening mode is 0.7 times the set torque T (VF=T×0.7), the control start torque of the hard tightening mode is also 0.7 times the set torque T (VF=T×0.7), and the control start torque of the checking tightening mode is VF=50 N·m (<T×0.5).

In the motor feedback control (step S304), as shown in FIGS. 7 to 9, in the case where the rate of increase of measured torque is greater than a predetermined value, based on the measured torque from the torque detector 50 (Yes in step S305), the control unit 33 performs control to reduce the power supply from the motor drive circuit 36 to the motor 24 (step S306), and if the rate of increase of measured torque is less than or equal to the predetermined value (No in step S305), the processing proceeds to the following step S307.

As shown in FIGS. 7 to 9, conversely, in the case where the rate of increase of measured torque from the torque detector 50 is less than a predetermined value (Yes in step S307), the control unit 33 performs control to increase the power supply from the motor drive circuit 36 to the motor 24 (step S308), and if the rate of increase of measured torque is the predetermined value or greater (No in step S307), the processing proceeds to the following step S309.

The feedback control (steps S305 to S308) is executed until the measured torque from the torque detector 50 reaches the set torque T set in correspondence with each of the tightening modes (No in step S309). When measured torque reaches the set torque T (Yes in step S309), the control unit 33 blocks the power supply from the motor drive circuit 36 to the motor 24, and stop the output of the motor 24 (step S310; circled number 3 in FIGS. 7 to 9).

A graph showing the change in tightening torque in the tightening flow corresponding to each tightening mode, and a graph showing the change in output of the motor 24 are respectively shown as A and B in FIGS. 7 to 9.

Referring to FIGS. 7 to 9, it can be seen that the measured torque increases approximately linearly in each of the tightening modes due to the initial output (V0) being applied, and then when the first control start torque or the second control start torque (VF) corresponding to the tightening mode is reached, the measured torque increases in a phased manner through repeated increases and decreases in torque, and approaches the set torque T.

Because the motor 24 has a large initial output in the normal tightening mode and the hard tightening mode serving as the first tightening process, tightening can be performed in a short time, although at the risk of the tightening torque overshooting. In this case, the fastening member would be tightened to an even greater tightening torque if tightening in the normal tightening mode or the hard tightening mode were performed in the second tightening process which is for checking the tightening torque.

In the present invention, overshooting is unlikely to occur, because the tightening torque is checked in the checking tightening mode of the second tightening process in which the initial output (V0) of the motor 24 is less than in either the normal tightening mode or the hard tightening mode. Accordingly, it can be accurately confirmed that the fastening member is tightened to the set tightening torque or greater.

That is, when the second tightening process is implemented on a fastening member that was tightened to less than the set torque in the first tightening process, the tightening torque can be increased to the set torque. On the other hand, when the second tightening process is implemented on a fastening member that was tightened to the set torque or greater in the first tightening process, it can be confirmed that the fastening member is tightened to the set torque or greater, without further increasing or loosening the tightening torque.

Being able to check that tightening has been performed to the set torque or greater in the second tightening process, without loosening the fastening member, is highly effective when applied to the tightening of wheel nuts, which was conventionally performed by loosening and retightening the wheel nuts.

The foregoing description is intended to illustrate the present invention, and should not be construed as limiting the invention defined in the claims or as restricting the scope of the invention. Also, the configuration of each element of the invention is not limited to the foregoing examples, and various modifications can be made within the technical scope of the claims.

For example, the first tightening process and the second tightening process can also be executed continuously on each fastening member, or the first tightening process may firstly be executed on a plurality of fastening members, and the second tightening process may then be executed collectively on these fastening members. Also, a configuration may be adopted in which only the second tightening process is executed on a fastening member tightened by another tightening device.

WORKING EXAMPLES

Example 1

Tightening of a fastening target with respect to which the torque increment from 10% to 100% of the target torque is equivalent to an angular displacement of 27 degrees or less was performed. In the tightening, a F10T high-tensile hexagon bolt (JIS B 1186) having an M45 nominal diameter and a length of 130 mm was used as a fastening member on a steel plate having a thickness of 51 mm.

The set torque was T=600 N·m, and the normal tightening mode and the hard tightening mode were each implemented from an 10 N·m seated state as the first tightening process. The results are shown in FIG. 10.

Figure 10:
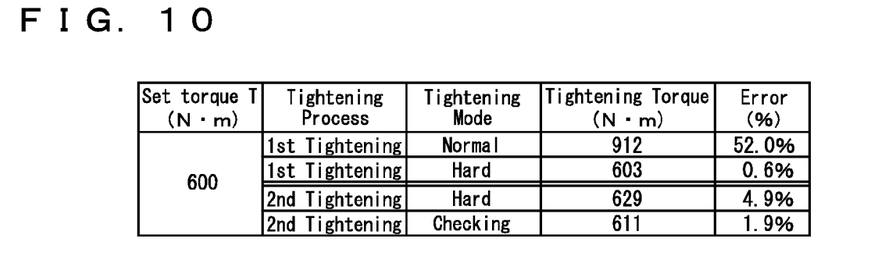
FIG. 10 shows the table showing the results of a working example 1.

Referring to FIG. 10, the tightening torque in the normal tightening mode greatly overshoots more than the hard tightening mode. This indicates that the hard tightening mode is suitable for the first tightening process on a fastening target with respect to which the torque increment from 10% to 100% of the target torque is equivalent to an angular displacement of 27 degrees or less.

Next, the second tightening process was implemented after tightening the abovementioned fastening target to 600 N·m in the first tightening process. The checking tightening mode and the hard tightening mode for comparison were implemented as the second tightening process. The results are shown in FIG. 10.

Referring to FIG. 10, it is evident that tightening can be performed to a more accurate tightening torque in the checking tightening mode compared with the hard tightening mode, at a smaller initial output of the motor 24.

From the above, it is evident that in tightening a fastening target with respect to which the torque increment from 10% to 100% of the target torque is equivalent to an angular displacement of 27 degrees or less, it is favorable to employ a combination of the hard tightening mode as the first tightening process and the checking tightening mode as the second tightening process.

Example 2

Tightening of a fastening target with respect to which the torque increment from 10% to 100% of the target torque is equivalent to an angular displacement of over 27 degrees was performed. In the tightening, a F10T high-tensile hexagon bolt (JIS B 1186) having an M24 nominal diameter and a length of 90 mm was used as a fastening member on a steel plate having a thickness of 40 mm.

The set torque was T=600 N·m, and the normal tightening mode and the hard tightening mode were each implemented from an 10 N·m seated state as the first tightening process. The results are shown in FIG. 11.

Figure 11:
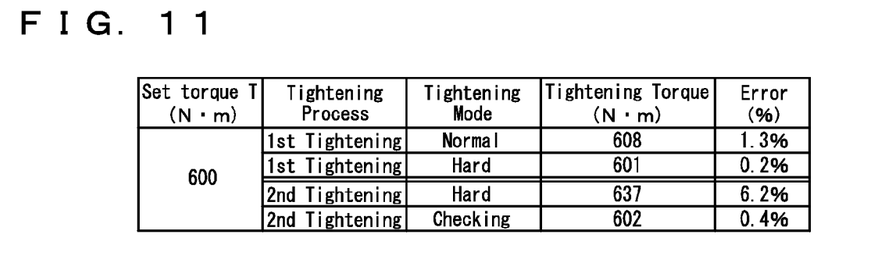
FIG. 11 shows the table showing the results of a working example 2.

Referring to FIG. 11, the tightening torque in the normal tightening mode greatly overshoots more than the hard tightening mode. However, the amount of overshoot amount is small compared with the Example 1. Accordingly, it is evident that the normal tightening mode in which tightening can be performed in a short time is suitable for the first tightening process on a fastening target with respect to which the torque increment from 10% to 100% of the target torque is equivalent to an angular displacement of over 27 degrees.

Next, the second tightening process was implemented after tightening the abovementioned fastening target to 600 N·m in the first tightening process. The checking tightening mode and the hard tightening mode for comparison were implemented as the second tightening process. The results are shown in FIG. 11.

Referring to FIG. 11, it is evident that tightening can be performed to a more accurate tightening torque in the checking tightening mode compared with the hard tightening mode, at a smaller output of the motor 24.

From the above, it is evident that in tightening a fastening target with respect to which the torque increment from 10% to 100% of the target torque is equivalent to an angular displacement of over 27 degrees, it is favorable to employ a combination of the normal tightening mode as the first tightening process and the checking tightening mode as the second tightening process.

What is claimed is:

1. A tightening device comprising:
  a motor;
  a motor drive circuit that drives the motor;
  a drive shaft that is rotated by the motor, has a socket mounted on a tip thereof, and is configured to tighten a fastening member;
  a torque detector that detects a tightening torque that acts on the socket; and
  a control unit that controls the motor drive circuit based on a set torque set in advance and a measured torque measured by the torque detector,
  wherein the control unit executes a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque, and then executes a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque while maintaining at least the initial output, and blocking power supply to the motor when the measured torque reaches the second set torque.

2. The tightening device according to claim 1,
  wherein the second control start torque is less than the first control start torque.

3. The tightening device according to claim 2,
  wherein the torque detector is mounted to the drive shaft, and
  the torque detector and the control unit perform signal transmission and reception by wireless communication.

4. The tightening device according to claim 1,
  wherein the torque detector is mounted to the drive shaft, and
  the torque detector and the control unit perform signal transmission and reception by wireless communication.

5. A method of controlling a tightening device that includes a motor, a motor drive circuit that drives the motor, a drive shaft that is rotated by the motor, has a socket mounted on a tip thereof, and is configured to tighten a fastening member, and a torque detector that detects a tightening torque that acts on the socket, the method comprising:
  a first tightening process of controlling the motor drive circuit, adjusting an output of the motor after the measured torque that is measured by the torque detector has reached a preset first control start torque, such that the measured torque reaches a preset first set torque in a phased manner through repeated increases and decreases in torque, and blocking power supply to the motor when the measured torque reaches the first set torque; and
  a second tightening process of controlling the motor drive circuit to drive the motor at an initial output that is less than in the first tightening process, adjusting the output of the motor after the measured torque that is measured by the torque detector has reached a preset second control start torque, such that the measured torque reaches a preset second set torque in a phased manner through repeated increases and decreases in torque while maintaining at least the initial output, and blocking power supply to the motor when the measured torque reaches the second set torque.

6. The method of controlling a tightening device according to claim 5,
  wherein the second control start torque is less than the first control start torque.

7. The method of controlling a tightening device according to claim 6,
  wherein the first tightening process is executed on a plurality of the fastening members, and then the second tightening process is executed on the plurality of fastening members.

8. The method of controlling a tightening device according to claim 5,
  wherein the first tightening process is executed on a plurality of the fastening members, and then the second tightening process is executed on the plurality of fastening members.

* * * * *